United States Patent
Shinbata

(10) Patent No.: US 7,454,079 B2
(45) Date of Patent: Nov. 18, 2008

(54) IMAGE PROCESSING APPARATUS, IMAGE PROCESSING METHOD, PROGRAM, AND COMPUTER-READABLE MEDIUM

(75) Inventor: Hiroyuki Shinbata, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 586 days.

(21) Appl. No.: 10/970,340

(22) Filed: Oct. 21, 2004

(65) Prior Publication Data

US 2005/0089242 A1    Apr. 28, 2005

(30) Foreign Application Priority Data

Oct. 23, 2003    (JP)    ............................ 2003-363202

(51) Int. Cl.
G06K 9/40 (2006.01)
G06K 9/36 (2006.01)
H04N 1/38 (2006.01)

(52) U.S. Cl. .................. 382/260; 382/275; 358/463

(58) Field of Classification Search ......... 382/128–134, 382/263–264, 274, 275, 260; 378/62, 98; 358/463, 532

See application file for complete search history.

(56) References Cited

U.S. PATENT DOCUMENTS

| | | | |
|---|---|---|---|
| 5,200,840 A * | 4/1993 | Koike et al. | 358/451 |
| 5,852,648 A * | 12/1998 | Miyamoto et al. | 378/62 |
| 6,163,619 A | 12/2000 | Maruo | |
| 6,343,158 B1 * | 1/2002 | Shiohara | 382/261 |
| 6,724,938 B1 * | 4/2004 | Matsumura | 382/199 |
| 6,823,090 B2 | 11/2004 | Matsuura | |
| 2002/0031247 A1 | 3/2002 | Matsuura et al. | |
| 2002/0054713 A1 | 5/2002 | Matsuura | |

FOREIGN PATENT DOCUMENTS

JP    2002-092588    3/2002
TW    343308 B    10/1998

OTHER PUBLICATIONS

Taiwanese Decision of Rejection (Nov. 23, 2006).

* cited by examiner

*Primary Examiner*—Kanji Patel
(74) *Attorney, Agent, or Firm*—Morgan & Finnegan, L.L.P.

(57) ABSTRACT

An image processing apparatus generates, from original image data, low- and high-frequency components of the original image data. By smoothing at least some of the high-frequency components, the second high-frequency component is generated. Image data is generated on the basis of the generated second high-frequency component.

8 Claims, 4 Drawing Sheets

IMAGE PROCESSING APPARATUS, IMAGE PROCESSING METHOD, PROGRAM, AND COMPUTER-READABLE MEDIUM

FIELD OF THE INVENTION

The present invention relates to an image processing apparatus, image processing method, program, and computer-readable medium which attenuate noise and, more particularly, to an image processing apparatus, image processing method, program, and computer-readable medium which attenuate noise by smoothing high-frequency components or high-frequency coefficients.

BACKGROUND OF THE INVENTION

With recent advances in digital technology, a radiographic image is transformed into a digital image signal, which is displayed on a CRT or the like or printed out upon being subjected to image processing such as frequency processing. This frequency processing generally includes so-called sharpening processing which adds high-frequency components to an original image. Image processing which makes noise inconspicuous is also performed by smoothing an original image. As described in Japanese Patent Laid-Open No. 2002-92588, medical image processing recently starts using multi-frequency processing which performs frequency processing by separating an original image into a plurality of high-frequency coefficients for respective frequency bands and increasing or decreasing the high-frequency coefficient for each frequency band.

SUMMARY OF THE INVENTION

It is an object of the present invention provide an image processing apparatus, image processing method, program, and computer-readable medium which attenuate noise components by smoothing high-frequency components or high-frequency coefficients.

According to one aspect of the present invention, there is provided an image processing apparatus comprising: high-frequency component generating means for generating, from original image data, low- and high-frequency components of the original image data; noise attenuation means for smoothing at least part of the high-frequency component generated by the high-frequency component generating means to generate a second high-frequency component; and processed image generating means for generating image data on the basis of the second high-frequency component.

Also, according to another aspect of the present invention, there is provided an image processing apparatus comprising: high-frequency component generating means for generating, from original image data, a high-frequency coefficient for a plurality of frequency bands; noise attenuation means for smoothing the high-frequency coefficient generated by the high-frequency component generating means to generate a second high-frequency coefficient; and processed image generating means for generating image data by restoring the second high-frequency coefficient.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

First Embodiment

Figure 1:
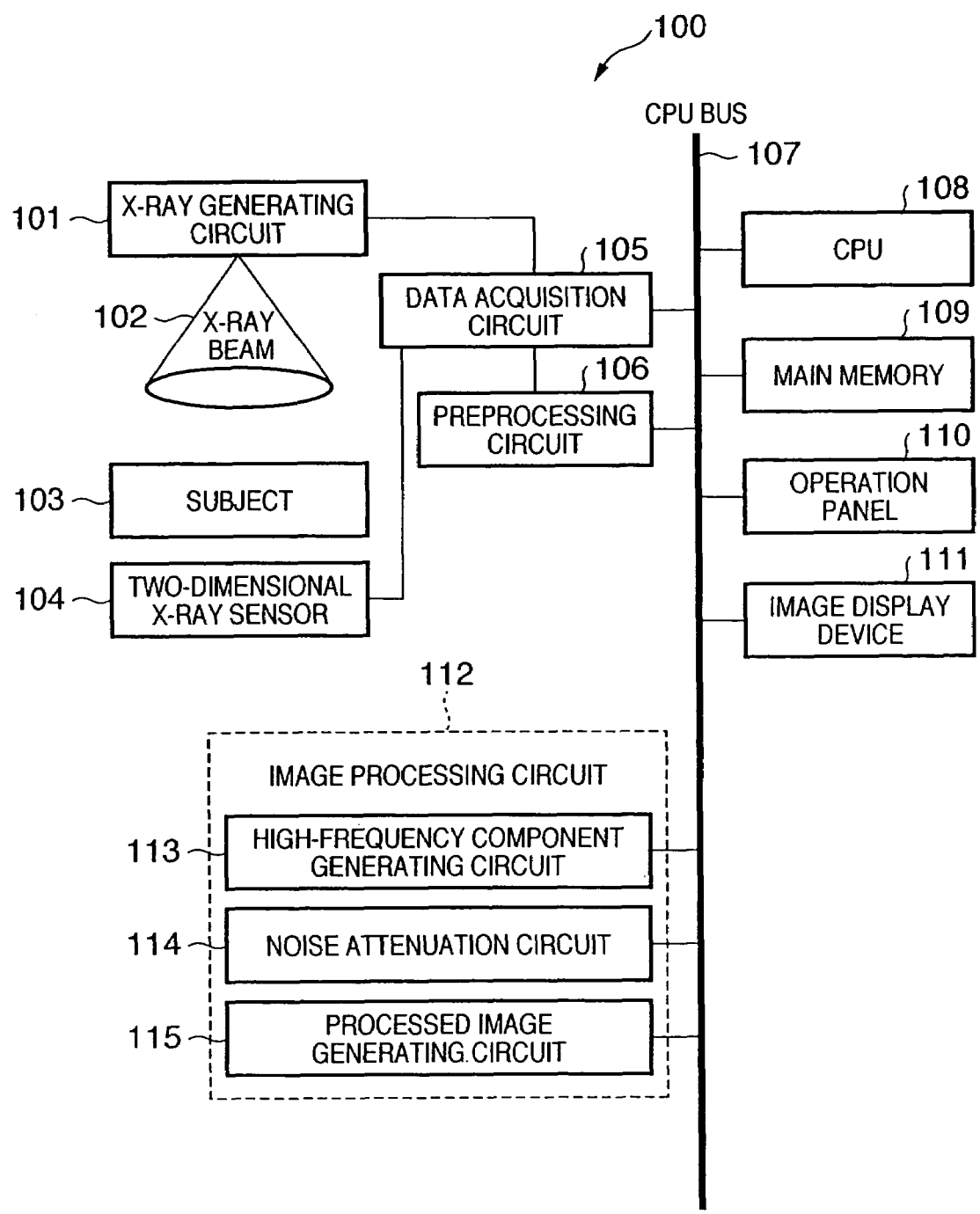
FIG. 1 is a block diagram of an image processing apparatus according to the first embodiment of the present invention.

FIG. 1 shows an X-ray imaging apparatus 100 according to the first embodiment of the present invention. The X-ray imaging apparatus 100 has a function of processing radiographed image data for each frequency band and comprises a preprocessing circuit 106, CPU 108, main memory 109, operation panel 110, image display device 111, and image processing circuit 112. These components exchange data through a CPU bus 107.

Figure 2:
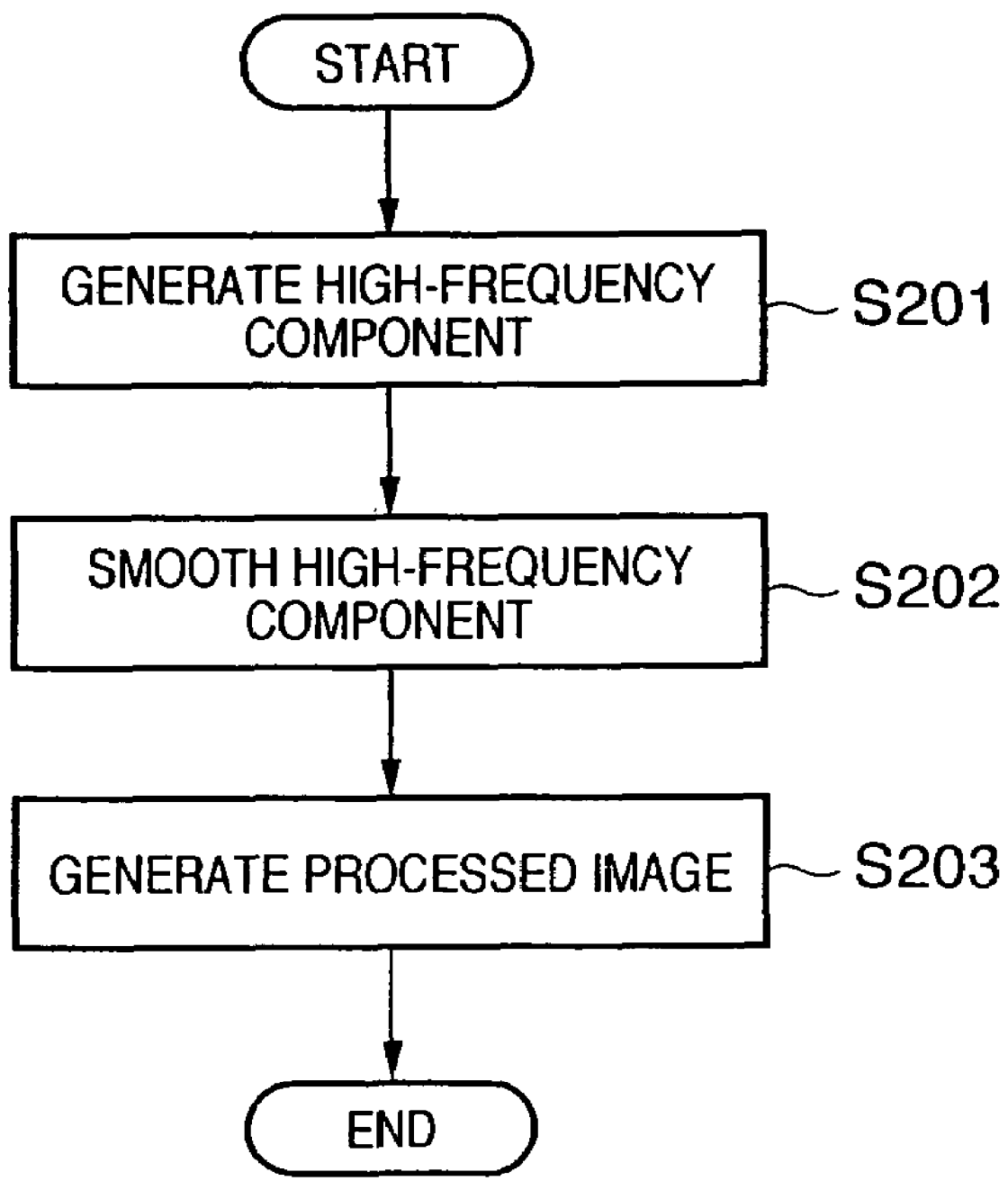
FIG. 2 is a flowchart showing the processing procedure of the image processing apparatus according to the first embodiment of the present invention.

The X-ray imaging apparatus 100 also comprises a data acquisition circuit 105 connected to the preprocessing circuit 106, and a two-dimensional X-ray sensor 104 and X-ray generating circuit 101 which are connected to the data acquisition circuit 105. These circuits are also connected to the CPU bus 107. FIG. 2 is a flowchart showing the flow of processing in the X-ray imaging apparatus 100 according to the first embodiment of the present invention.

In the above X-ray imaging apparatus 100, the main memory 109 stores various data required for processing in the CPU 108 and the like, and includes a work memory for operation by the CPU 108. Note that the program codes produced in accordance with the flowchart shown in FIG. 2 are stored in the main memory 109 or a ROM (not shown) and are read out and executed by the CPU 108.

The CPU 108 controls the operation of the overall apparatus by using the main memory 109 in accordance with the operation instructions input from the operation panel 110. With this control, the X-ray imaging apparatus 100 operates as follows.

First of all, the X-ray generating circuit 101 emits an X-ray beam 102 to a subject 103 to be examined.

The X-ray beam 102 emitted from the X-ray generating circuit 101 is transmitted through the subject 103 while being attenuated, reaches the two-dimensional X-ray sensor 104, and is output as X-ray image data from the two-dimensional X-ray sensor 104. Assume that in this case, the X-ray image data output from the two-dimensional X-ray sensor 104 is human body image data.

The data acquisition circuit 105 converts the X-ray image data output from the two-dimensional X-ray sensor 104 into an electrical signal and supplies it to the preprocessing circuit 106. The preprocessing circuit 106 performs preprocessing such as offset correction processing or gain correction processing with respect to the signal (X-ray image signal) from the data acquisition circuit 105. The X-ray image signal having undergone the preprocessing in the preprocessing circuit 106 is transferred as original image data to the main memory 109 and image processing circuit 112 through the CPU bus 107 under the control of the CPU 108.

Reference numeral 112 denotes a block diagram showing the arrangement of the image processing circuit. In the image processing circuit 112, reference numeral 113 denotes a high-frequency component generating circuit which generates a high-frequency component by subtracting smoothed image data from an original image or generates a high-frequency coefficient by filtering such as Laplacian pyramid transform or wavelet transform. Reference numeral 114 denotes a high-frequency component smoothing circuit which smoothes a predetermined region of the high-frequency component or high-frequency coefficient generated by the high-frequency component generating circuit 113. Reference numeral 115 denotes a processed image generating circuit which generates processed image data on the basis of the high-frequency component or high-frequency coefficient changed by the high-frequency component smoothing circuit 114.

FIG. 2 is a flow chart showing the flow of processing in the image processing circuit 112. Note that the filtering is not limited to Laplacian pyramid transform or wavelet transform. Any filtering that can be used for frequency decomposition may be adopted.

The first embodiment will be described below along the flow of processing in FIG. 2.

The high-frequency component generating circuit 113 generates smoothed image data f1(x, y) in accordance with equation (1) (s201). Let f(x, y) be a pixel value at coordinates (x, y) on an original image. Constants d1, d2, d3, and d4 are experimentally determined.

$$f1(x, y) = \frac{\int_{-d2}^{d1} \int_{-d4}^{d3} f(x, y) dx dy}{\int_{-d2}^{d1} \int_{-d4}^{d3} dx dy} \quad (1)$$

The high-frequency component smoothing circuit 114 calculates a high-frequency component fh(x, y) using the smoothed image data f(x, y) (s201) as given by:

$$fh(x, y) = f(x, y) - f1(x, y) \quad (2)$$

The high-frequency component smoothing circuit 114 calculates a mask size M(x) for generating smoothed image data of the high-frequency component fh(x, y) using predetermined parameters as given by equation (3). D1, D2, D3, and D4 are assumed to be constants. The mask size gradually increases from 1 at the pixel value D2 or less and becomes constant at the pixel value D3.

If $f(x, y) \geq D2 M(f(x, y)) = 1$ (no smoothing processing)

If $f(x, y) < D2 M(f(x, y)) = D4 \times (D1 - f(x, y) \times (D1/D2)) + 1$

If $f(x, y) < D3 M(f(x, y)) = D4 \times (D1 - D3 \times D1/D2) + 1 \quad (3)$

The high-frequency component smoothing circuit 114 performs smoothing processing on the basis of the mask size M(x) as given by equation (4) (s202). Let fh2(x, y) be processed image data.

$$fH(x, y) = \frac{\int_{-d2}^{d1} \int_{-d4}^{d3} fh(x, y) dx dy}{\int_{-d2}^{d1} \int_{-d4}^{d3} dx dy} \quad (4)$$

$$d1 = d2 = d3 = d4 = M(x) - 1 \quad (5)$$

The mask size is so set as to be constant at the pixel value D3 or less. The gradual increase in mask size aims at preventing generation of an artifact such as a false outline by discontinuous smoothing.

The processed image generating circuit 115 adds the partially smoothed high-frequency component fh2(x, y) to the smoothed image data f1(x, y) as given by (6), thereby obtaining processed image data Pr(x, y) (s203).

$$Pr(x, y) = f1(x, y) + fH(x, y) \quad (6)$$

It is also possible to further decompose a high-frequency component by repeating equations (1) and (2) for the high-frequency component and generate a higher-frequency component. More specifically, by replacing the original image data f(x, y) in equation (1) with the high-frequency component fh(x, y), a subdivided high-frequency component fh(x, y) can be generated by equation (2). In this manner, high-frequency components corresponding to a plurality of frequency bands can be generated. In this case as well, noise components can be attenuated by smoothing processing for the respective components corresponding to a plurality of frequency bands. If equation (6) is repeated for the processed image data having undergone smoothing processing, final processed image data can be calculated.

As described above, according to the first embodiment, smoothing of high-frequency components causes attenuation of noise because noise is mainly comprised of high-frequency components. This improves the image quality of the entire image data. Since high-frequency components are particularly smoothed, it is unnecessary to determine the amount by which high-frequency components corresponding to noise are to be increased/decreased. This makes it possible to appropriately reduce noise components. If original image data itself is smoothed, intermediate- and low-frequency data which contain less noise components are lost, and the image quality cannot be increased efficiently. On the contrary, according to the first embodiment, noise components can be reduced in a frequency band which contains many noise components, and information loss in processed image data can be suppressed. When high-frequency components are uniformly reduced, data contained in them are lost. On the other hand, when high-frequency components are smoothed, only random nonuniform components (corresponding to noise) can be removed, and data loss in high-frequency components can be minimized. This is because the random nonuniformity is eliminated, and the inherent values of the high-frequency components are substantially retained.

Also, it is possible to perform noise attenuation processing for a specific region which contains many noise components by smoothing high-frequency components on the basis of the pixel values of original image data. A region with a low pixel value tends to contain much noise.

A method of smoothing high-frequency components is not limited to the above-mentioned one. Any method such as one using morphology may be adopted.

Second Embodiment

The first embodiment has described frequency processing which uses the moving average. The second embodiment will describe a case which uses multi-frequency processing typified by wavelet transform.

Figure 3A:
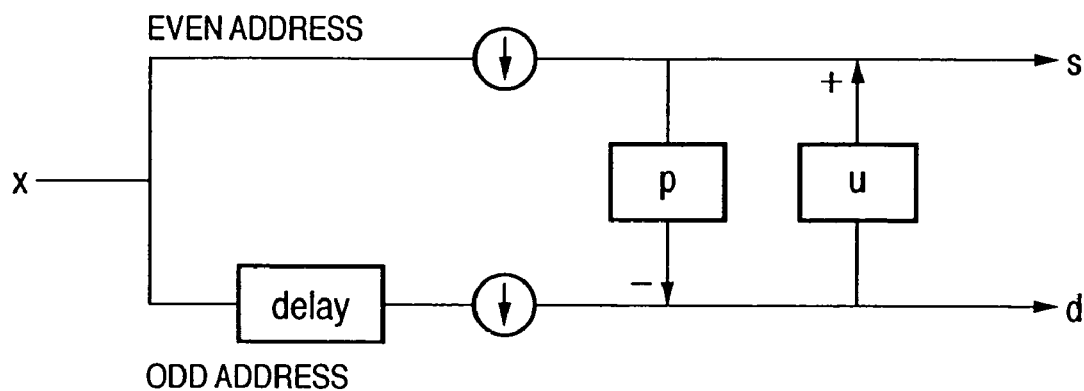
FIGS. 3A to 3C are block diagrams of an image processing apparatus according to the second embodiment of the present invention.
Figure 3B:
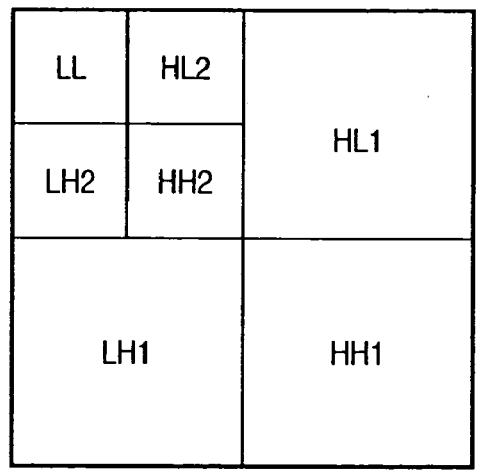
Figure 3C:
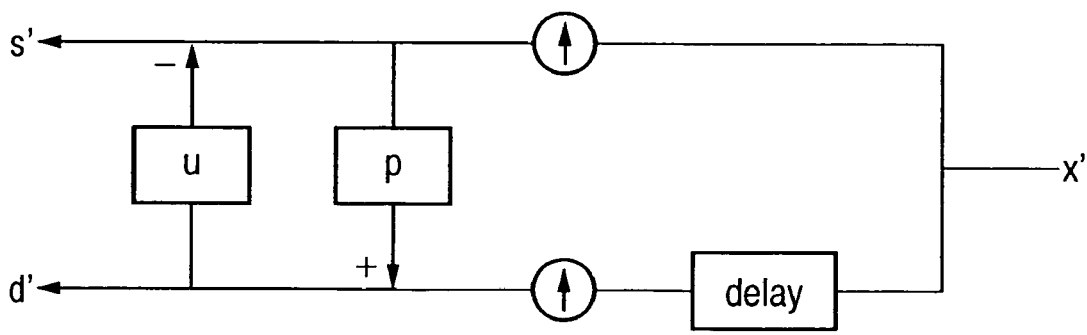
Figure 4:
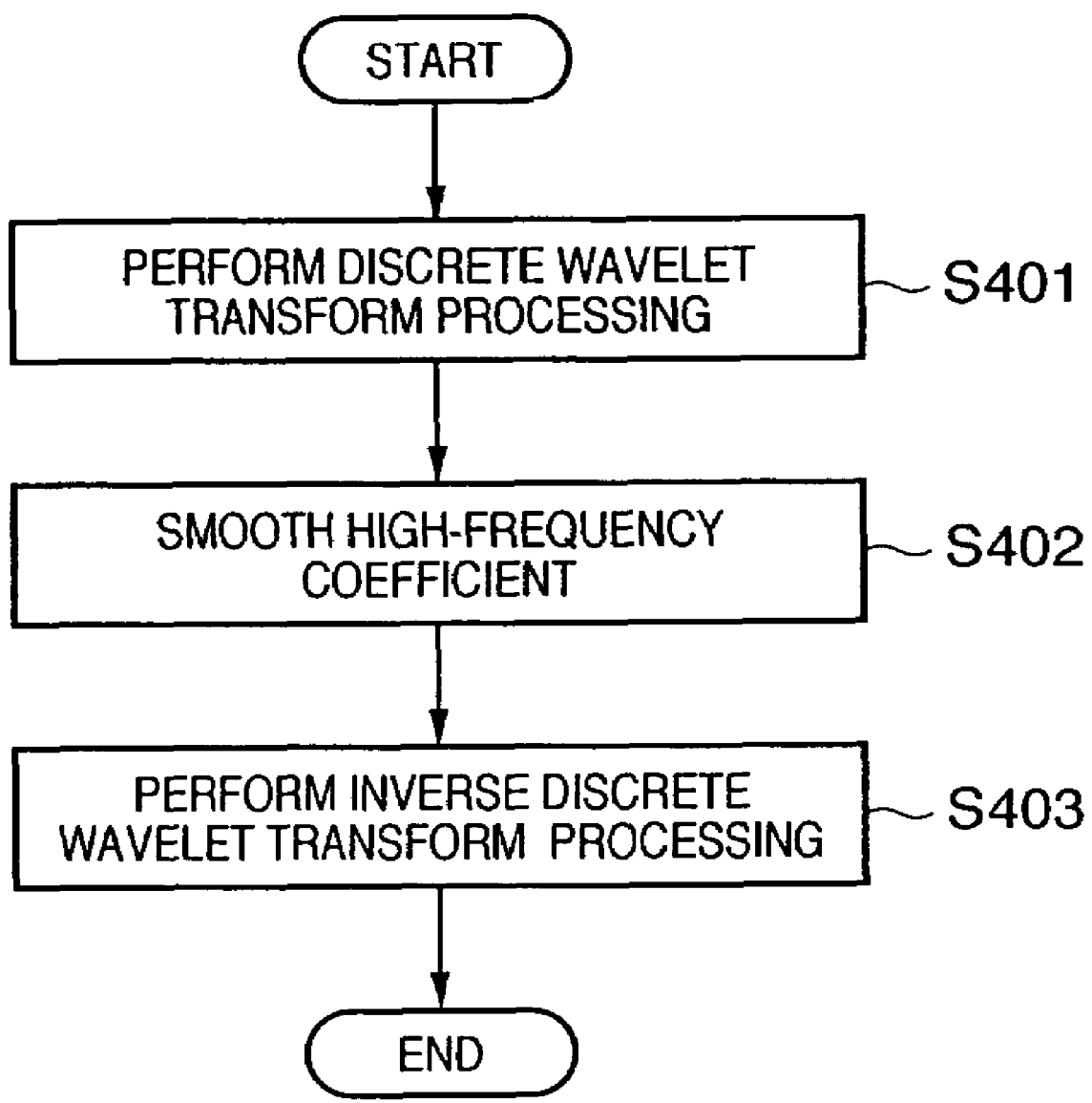
FIG. 4 is a flowchart showing the processing procedure of the image processing apparatus according to the second embodiment of the present invention.

FIG. 3A is a diagram showing the arrangement of a DWT circuit; FIG. 3B, an example of the arrangement of transform coefficient groups of two levels obtained by the two-dimensional transform processing; and FIG. 3C, a diagram showing the arrangement of an inverse DWT circuit. FIG. 4 is a flowchart showing the flow of processing in the second embodiment.

In a high-frequency component generating circuit 113 according to this embodiment, an input image signal is separated into odd and even address signals by a combination of a delay element and down samplers. These signals undergo filter processes using two filters p and u. Reference symbols s and d denote low- and high-pass coefficients, respectively, upon decomposing a one-dimensional image signal to one level. The coefficients are calculated by:

$$d(n)=x(2*n+1)-\text{floor}((x(2*n)+x(2*n+2))/2) \quad (7)$$

$$s(n)=x(2*n)+\text{floor}((d(n-1)+d(n))/4) \quad (8)$$

where x(n) is an image signal to be transformed.

With the above-mentioned processing, one-dimensional discrete wavelet transform processing is performed for image signals.

Two-dimensional discrete wavelet transform is attained by sequentially performing the above-mentioned one-dimensional transform in the horizontal and vertical directions of image data. Since details of two-dimensional discrete wavelet transform are known to those who are skilled in the art, a detailed description thereof will be omitted. FIG. 3B shows an example of the arrangement of transform coefficient groups of two levels obtained by the two-dimensional transform processing. In FIG. 3B, an image signal is decomposed into coefficient components HH1, HL1, LH1, ... , LL of different frequency bands (s401). These components HH1, HL1, LH1, ... , LL in FIG. 3B (to be referred to as subbands hereinafter) represent high-frequency coefficients of the respective frequency bands.

$$hh2(x, y) = \frac{\int_{-d2}^{d1}\int_{-d4}^{d3} HH1(x, y)dxdy}{\int_{-d2}^{d1}\int_{-d4}^{d3} dxdy} \quad (9)$$

The high-frequency component smoothing circuit 114 smoothes the high-frequency coefficients (HH1, HL1, LH1, and the like) except the coefficient component LL by using equation (9) in the same manner as in the first embodiment and generates new high-frequency coefficients (s402). Equation (9) shows an example wherein a high-frequency coefficient HH1(x, y) at coordinates (x, y) is smoothed using mask sizes d1, d2, d3, and d4 to generate a new high-frequency coefficient hh2(x, y). The mask sizes are assumed to be the same constant. The processed image generating circuit 115 performs inverse DWT transform in accordance with an inverse DWT transform scheme in a manner to be described later (s403). FIG. 3C shows the arrangement of inverse discrete wavelet transform processing. An input image component undergoes filter processes using two filters u and p and are added to each other after being up-sampled, thus outputting an image signal x'. These processes are done by:

$$x'(2*n)=s'(n)-\text{floor}((d'(n-1)+d'(n))/4) \quad (10)$$

$$x'(2*n+1)=d'(n)+\text{floor}((x'(2*n)+x'(2*n+2))/2) \quad (11)$$

With the above-mentioned processing, one-dimensional inverse discrete wavelet transform processing is performed for transform coefficients. Two-dimensional inverse discrete wavelet transform is attained by sequentially performing the above-mentioned one-dimensional inverse transform in the horizontal and vertical directions of image data. Since details of two-dimensional inverse discrete wavelet transform are known to those who are skilled in the art, a detailed description thereof will be omitted.

In the above description, high-frequency coefficients are smoothed using a single mask size. However, it is also preferable to prepare different mask sizes for respective high-frequency coefficients and smooth the high-frequency coefficients using the mask sizes. For example, coefficients may be smoothed using different mask size schedules for HH1, HH2, and HL1, respectively. In this case, more precise noise attenuation processing can be performed for each frequency band, and the image quality can be increased efficiently. Noise exists locally in a specific subband, and noise components can accurately be attenuated by changing for each subband the level of a region whose noise is to be smoothed.

A conventional method cannot appropriately reduce noise components when coefficients corresponding to noise are analytically obtained, and the amount by which the coefficients are to be increased/decreased is inappropriate. A method of smoothing high-frequency coefficients need not determine the amounts by which respective high-frequency coefficients are to be increased/decreased and can appropriately attenuate noise components. Although the variance of high-frequency coefficients corresponding to a region which is visually recognized as noise is generally large, it can be reduced by smoothing. The high-frequency coefficient smoothing method also need not analytically calculate coefficients corresponding to noise components. This makes it possible to suppress a reduction in information amount of image data due to unsuccessful analysis. Even if high-frequency coefficients are smoothed, and the variance is reduced, high-frequency coefficients do not become constant, and the values for the high-frequency coefficients are retained. This also makes it possible to suppress a reduction in information amount of the image.

As described above, the second embodiment can perform more precise noise attenuation processing for each frequency band and can appropriately improve the image quality.

The second embodiment has described an example which uses a wavelet filter. A filter used for decomposition into frequency bands is not limited to this wavelet filter, and any other filter may be adopted.

Note that an example which uses a Laplacian filter generally adopts Laplacian pyramid transform.

The object of the present invention is realized even by supplying a storage medium storing software program codes for realizing the functions of an apparatus or system according to the first and second embodiments to the apparatus or system, and causing the computer (or a CPU or an MPU) of the apparatus or system to read out and execute the program codes stored in the storage medium.

In this case, the program codes read out from the storage medium realize the functions of the first and second embodiments by themselves, and the storage medium storing the program codes or the program codes constitute the present invention.

As a storage medium for supplying the program codes, a ROM, floppy (registered trademark) disk, hard disk, optical disk, magnetooptical disk, CD-ROM, CD-R, magnetic tape, nonvolatile memory card, or the like can be used.

Embodiments of the present invention include a case wherein the functions of the first and second embodiments are realized not only when the readout program codes are executed by the computer but also when the OS running on the computer performs part or all of actual processing on the basis of the instructions of the program codes.

Embodiments of the present invention include a case wherein the functions of the first and second embodiments are also realized when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes.

If the present invention is applied to this program or a storage medium storing the program, the program comprises program codes corresponding the flowchart shown in FIG. 2 or FIG. 4.

As many apparently widely different embodiments of the present invention can be made without departing from the spirit and scope thereof, it is to be understood that the invention is not limited to the specific embodiments thereof except as defined in the claims.

CLAIM OF PRIORITY

This application claims priority from Japanese Patent Application No. 2003-363202 filed on Oct. 23, 2003, which is hereby incorporated by reference herein.

What is claimed is:

1. An image processing apparatus comprising:
   high-frequency component generating means for generating, from original image data, two-dimensionally distributed low-frequency components and two-dimensionally distributed high-frequency components of the original image data;
   noise attenuation means for smoothing a high-frequency component in the two-dimensionally distributed high-frequency components based on high frequency components within a distance range from the high-frequency component to be processed, the distance range being determined based on a pixel value, corresponding to the high-frequency component to be processed, in the original image data; and
   processed image generating means for generating image data on the basis of the high-frequency component whose noise components are attenuated by the noise attenuation means.

2. The apparatus according to claim 1, wherein said noise attenuation means performs smoothing by moving-averaging at least one high-frequency component.

3. The apparatus according to claim 1, wherein said noise attenuation means performs smoothing by moving-averaging at least one high-frequency component, and a mask size which indicates a moving average range is changed on the basis of a pixel value of the original image data.

4. The apparatus according to claim 1, wherein said high-frequency component generating means generates a low-frequency component by smoothing the original image data.

5. The apparatus according to claim 4, wherein said processed image generating means generates a processed image by adding, to a smoothed image, at least one high-frequency component whose noise is attenuated by said noise attenuation means.

6. The apparatus according to claim 1, further comprising:
   radiation generating means for generating radiation;
   a sensor which converts the radiation into an electrical signal; and
   a circuit which converts the electrical signal into the original image data.

7. An image processing method comprising:
   a high-frequency component generating step of generating, from original image data, two dimensionally distributed low-frequency component and two dimensionally distributed high-frequency component of the original image data;
   a noise attenuation step of smoothing high-frequency component in the two dimensionally distributed high-frequency components based on high frequency components within a distance range from the high-frequency component to be processed, the distance range being determined based on a pixel value, corresponding to the high-frequency component to be processed, in the original image data; and
   a processed image generating step of generating image data on the basis of the high-frequency component whose noise components are attenuated in the noise attenuation step.

8. A computer-readable medium encoded with a computer program, the computer program being configured to make a computer execute the steps of the image processing method defined in claim 7.

* * * * *